No. 811,339. PATENTED JAN. 30, 1906.
Z. R. TUCKER.
BEARING FOR SPINDLES OF GRINDING MACHINES.
APPLICATION FILED JUNE 11, 1902.
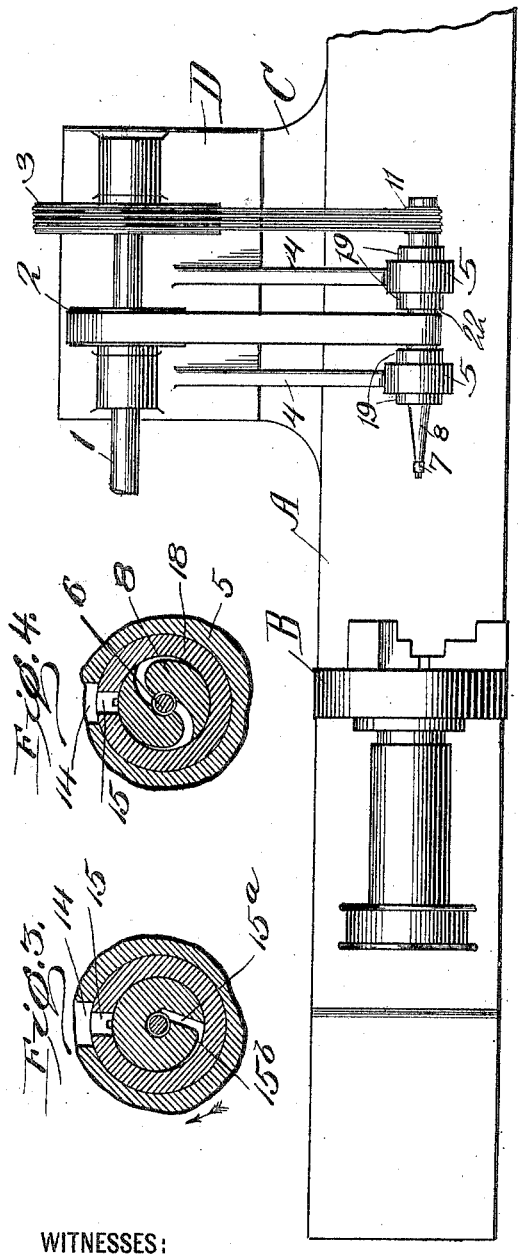
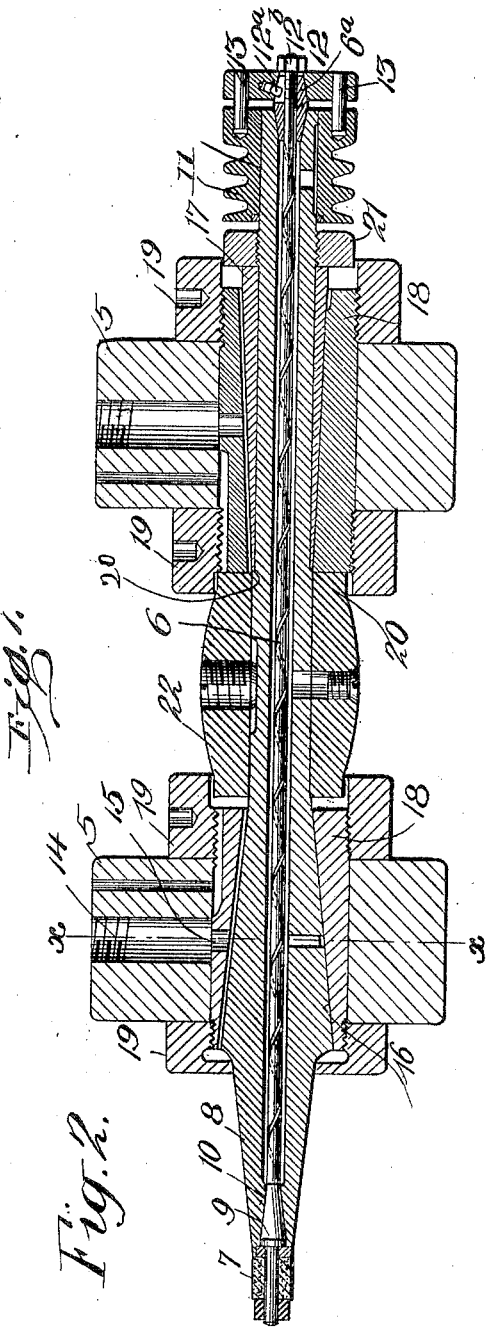
WITNESSES:
H. M. Seamans.
Allan W. Foose.
INVENTOR
Zechariah R. Tucker
BY
Duell, Megrath & Warfield
ATTORNEYS

UNITED STATES PATENT OFFICE.

ZECHARIAH RHODES TUCKER, OF PROVIDENCE, RHODE ISLAND, ASSIGNOR TO IROQUOIS MACHINE COMPANY, OF BEDFORD, NEW YORK, A CORPORATION OF NEW YORK.

BEARING FOR SPINDLES OF GRINDING-MACHINES.

No. 811,339.    Specification of Letters Patent.    Patented Jan. 30, 1906.

Application filed June 11, 1902. Serial No. 111,221.

*To all whom it may concern:*

Be it known that I, ZECHARIAH RHODES TUCKER, residing at Providence, in the county of Providence and State of Rhode Island, have invented certain new and useful Improvements in Bearings for Spindles of Grinding-Machines, &c., of which the following is a full, clear, and exact description, such as will enable others skilled in the art to which it appertains to make and use the same.

This invention relates to bearings for the tool-spindles of grinding-machines, &c.; and its object is to provide a mounting or bearing for such tool-spindles which shall be simple in construction, easily adjusted, and efficient in operation.

To this end the invention consists in the features of construction, arrangement of parts, and combinations of elements which will be hereinafter more fully set forth and the novel features thereof pointed out in the claims at the end of this specification.

The invention is illustrated in connection with a grinding-machine; but it will be evident that it is capable of application in connection with bearings of various kinds.

A specific embodiment of the invention is illustrated in the accompanying drawings, in which—

Figure 1 is a top plan view of a grinding-machine with my invention applied thereto, part of the bed being broken away. Fig. 2 is a longitudinal section of spindle and bearings constructed in accordance with my invention. Fig. 3 is a sectional view on line $x$ $x$ of Fig. 2, showing the means for supplying the lubricant to the tool-spindle. Fig. 4 is a similar view showing a modified form of lubricant-passages.

Similar reference characters refer to similar parts throughout the several views.

With especial reference to grinding-machines it will be understood that in grinding very small holes in order to obtain the requisite surface speed of the small emery-wheel it is necessary to get a very high speed of the spindle, and accordingly the small cone-bearings adjacent the emery-wheel which necessarily approximate in diameter somewhat closely the diameter of the emery-wheel are subjected to great friction in their bearings. The present construction is designed with a view of obviating this disadvantage and making possible the efficient use of a very small emery-wheel with correspondingly small spindle.

In Fig. 1, A represents diagrammatically the frame or bed of the machine, upon which is mounted a chuck B of any suitable construction. An extension C of the bed carries a fixture D, upon which in suitable bearings is supported an auxiliary or speeding shaft 1, having thereon a plain pulley 2 and grooved pulley 3. Arms 4 4 project from the fixture D and carry at the end thereof alined bearing-sleeves 5 5, which are adapted to carry a tool-spindle in line with the work in the chuck. The tool-spindle 6, which carries at one end the small emery or abrading wheel 7, extends through a long hollow sleeve 8, and a cone-bearing 9 on the spindle coöperates with a corresponding bearing-surface 10 of the sleeve. On the outer end of the spindle 6 is a taper sleeve or bearing $6^a$. This bearing-sleeve is threaded at its right-hand end only, and the main part of the hole through the same is not tapped, but is fitted upon the cylindrical part of the spindle 6, as shown in Fig. 2. The end of said sleeve is cut with one or more cuts, splitting the same down about one-half of its length. A small grooved pulley 11, which is adapted to be driven from a larger pulley 3, has a bearing upon the outer end of sleeve 8, and this pulley is connected to the spindle 6 in order to drive said spindle by means of a collar 12, which is bored with a taper-hole to fit the tapering end of the bearing $6^a$. This collar is also provided with a small pin $12^a$, entering one of the cuts in the bearing in order to prevent it from turning. A lock-nut $12^b$ holds the collar 13 on the spindle 6. This construction enables the operator to hold the bearing-sleeve in place as adjusted by means of the collar 12 while the nut $12^b$ is being tightened on the spindle and locks the taper-bearing in place. Pins 13 project from the pulley 11 and are adapted to fit loosely in holes in the driving-collar 12. In this way the parts will be securely locked together, yet in such manner as to allow a certain amount of freedom of movement of the pulley independent of that of the spindle in order to prevent undue heating of the bearings and for other purposes which will be obvious.

The sleeve 8 has independent bearings, such that it is rotatable with respect to the bearing-sleeves 5 and independently of the spindle 6. These bearings are formed by the bearing-surfaces 16 and 17 at its two ends, the first integral therewith and the second in the form of a sleeve adapted to be adjusted thereon, which coöperate with correspondingly-tapered bearing-sleeves 18, supported in any desired position within the bearing-sleeves 5 by means of the nuts 19, screwed onto the threaded outer ends of each bearing-sleeve 18. Thus the bearings can be adjusted very readily from the outside by loosening one nut 19, then adjusting the sleeve by means of the other, and tightening both nuts with the sleeve in any desired position. Sleeve 17 rests at its inner end against shoulders 20, formed on the sleeve 8, and can be adjusted and locked by means of the nut 21. Sleeve 8 may be rotated by means of pulley 22 fast thereon between the two supports. The respective bearings can be formed of any desired material, preferably so as to have opposite metals in contact for the purpose of reducing friction. Pulley 22 is driven by a belt from the pulley 2, and a construction is accordingly provided by which the wheel-spindle and its bearing-sleeve may be independently driven at speeds which may be proportioned as desired by properly proportioning the relative sizes of the driving and driven pulleys. In operation the wheel-spindle is driven at any desired speed, and the hollow spindle or sleeve through which it passes is driven at a proportionate speed in the same direction. Thus the friction between the cone-bearings of the tool-spindle and their bearing-surfaces in connection with the outer sleeve is reduced, as such friction is the result of a speed which is the difference in speeds of the tool-spindle 6 and the hollow spindle 8, and it is possible to drive grinding-wheels of very small diameter at a very high surface speed without injurious friction to the bearings.

The means for supplying a lubricant to the bore in the sleeve 8, through which the tool-spindle 6 passes, is shown most clearly in Figs. 3 and 4. A suitable oil-cup 14 is provided in the bearing-sleeve 5, and a passage 15 in the bearing-sleeve 18 communicates therewith. Through sleeve 8 a passage 15$^a$ is drilled from a point opposite the center, preferably, and as shown in Fig. 3, so that the center of the drilled oil-passage comes about tangent with the inner bore, through which the tool-spindle passes. A groove 15$^b$ is provided by filing or otherwise, which communicates with the passage 15$^a$ in such manner that as the sleeve revolves in the direction shown by the arrow it will take up oil from the passage 15 above and force it into the center against centrifugal force, owing to the angle at which the hole is drilled. This same result may be accomplished by coring a hole through the sleeve in the manner indicated in Fig. 4. Such arrangement of oil-passages is shown only at the left hand of Fig. 2; but it will be obvious that it might be applied to both of the bearings, if desired.

Having described my invention, what I claim as new, and desire to secure by Letters Patent, is—

1. In a device of the class described, a tool-spindle, bearings therefor, means for rotating said spindle, and means for rotating said bearings, said spindle and said bearings both being adapted to rotate upon the same axis of rotation.

2. In a device of the class described, a tool-spindle, a sleeve surrounding said spindle and provided with bearings therefor, and independent means for rotating said spindle and said sleeve upon the same axis of rotation.

3. In a device of the class described, a tool-spindle, a sleeve through which said spindle passes provided with bearings therefor, independent bearings for said sleeve, and means for rotating said sleeve and said bearings independently upon the same axis of rotation as that of said sleeve.

4. In a grinding-machine, in combination, a tool-spindle 6, a bearing-sleeve 8 therefor, additional bearings for said bearing-sleeve 8, and means for rotating said tool-spindle and said bearing-sleeve independently upon a common axis of rotation.

5. In a grinding-machine, in combination, a tool-spindle 6, a sleeve 8 through which said spindle passes and provided with a bearing-surface 10 coöperating with the cone-bearing 9 on one end of said spindle, a pulley 11 secured to the other end of said spindle and having a bearing on said sleeve 8, independent bearings for said bearing-sleeve, a pulley carried with said bearing-sleeve, and means for driving said pulleys independently.

6. In combination, a tool-spindle 6, a sleeve 8 through which said spindle passes, said spindle being provided with bearing-surfaces coöperating with corresponding bearing-surfaces within said sleeve, a pulley 11 having a bearing upon the end of said sleeve, and means for connecting said pulley to said spindle so that said spindle will be driven thereby and with a provision for lost motion in such connection.

7. In combination, a tool-spindle 6, a sleeve 8 through which said spindle passes, said spindle being provided with bearing-surfaces coöperating with corresponding bearing-surfaces within said sleeve, a pulley 11 upon the outer end of said sleeve, a collar 12 connected to the outer end of said spindle, and the pins 13 projecting from said pulley 11 and fitting loosely in holes in said collar, whereby said spindle is driven from said pulley with a certain amount of lost motion therebetween.

8. In combination, a tool-spindle 6, a sleeve 8 through which said spindle passes, said spindle and sleeve being provided with corresponding bearing-surfaces 9 and 10 at one end thereof, the other end of said spindle being threaded and provided with a bearing $6^a$ adjustable thereon and coöperating with a suitable bearing-surface within said sleeve, a pulley 11 having a bearing upon the outer end of said sleeve, a collar 12 connected to the outer end of said spindle, connections between said collar and said pulley, and means for driving said pulley.

9. In combination, a tool-spindle 6, a sleeve 8 through which said spindle passes, said spindle and sleeve being provided with corresponding bearing-surfaces 9 and 10 at one end thereof, the other end of said spindle being threaded and provided with a bearing $6^a$ adjustable thereon and coöperating with a suitable bearing-surface within said sleeve, the pulley 11 having a bearing upon the outer end of said sleeve, the collar 12 connected to said pulley, the pin-and-groove connection between said collar and said bearing $6^a$, and the locking and adjusting nut $12^b$ on the end of said spindle, substantially as and for the purposes set forth.

10. In a device of the class described, a tool-spindle, bearings within which said spindle is freely rotatable, and bearings within which said first-mentioned bearings are freely rotatable said spindle and said first-mentioned bearings being adapted to rotate upon a common axis of rotation.

11. In a device of the class described, a tool-spindle, bearings therefor, and common means for rotating said spindle and said bearings upon the same axis of rotation.

12. In a device of the class described, a tool-spindle, bearings therefor, and common means adapted to rotate said spindle and said bearings at different speeds upon a common axis of rotation.

13. In a device of the class described, a tool-spindle, a sleeve surrounding said spindle and provided with bearings therefor, said spindle being equidistant from the surrounding walls of said sleeve and means adapted to rotate said tool-spindle and said sleeve simultaneously at different rates of speed.

14. In combination, a spindle, concentrically-arranged bearings within which said spindle is mounted, concentrically-arranged bearings within which said first-mentioned bearings are mounted, and means adapted to rotate said spindle and said first-mentioned bearings simultaneously at different rates of speed.

15. In combination, a spindle, a sleeve within which said spindle is freely rotatable, concentrically-arranged bearings within which said sleeve is freely rotatable, and means adapted to rotate said sleeve and said spindle simultaneously in the same direction at different rates of speed.

16. In a grinding-machine, in combination, a tool-spindle, bearings within which said spindle is rotatable, and bearings within which said first-mentioned bearings are freely rotatable, said spindle and said first-mentioned bearings being adapted to be independently rotated and during such rotation to remain in the same relative position with respect to the article to be ground.

In testimony whereof I affix my signature in the presence of two witnesses.

ZECHARIAH RHODES TUCKER.

Witnesses:
HENRY C. BABCOCK,
ALICE H. ABORN.